United States Patent
Wang et al.

(12)
(10) Patent No.: US 6,239,061 B1
(45) Date of Patent: May 29, 2001

(54) ALUMINUM-PHOSPHINIMINE COMPLEXES AS CATALYSTS FOR THE (CO) POLYMERIZATION OF ETHYLENE

(75) Inventors: Qinyan Wang; Xiaoliang Gao; John McMeeking; Wei Xu, all of Calgary; Douglas W. Stephan, LaSalle, all of (CA)

(73) Assignee: Nova Chemicals (International) S.A. (CH)

(*) Notice: Subject to any disclaimer, the term of this patent is extended or adjusted under 35 U.S.C. 154(b) by 0 days.

(21) Appl. No.: 09/448,098

(22) Filed: Nov. 23, 1999

(30) Foreign Application Priority Data

Nov. 27, 1998 (CA) .................................................. 2254601

(51) Int. Cl.⁷ ............................. B01J 21/00; B01J 21/02; B01J 27/14; B01J 27/24
(52) U.S. Cl. ......................... 502/162; 502/167; 526/139; 526/141; 556/13; 556/14; 556/27; 556/170; 556/174; 556/176
(58) Field of Search ..................................... 502/162, 167; 526/139, 141; 556/13, 14, 27, 170, 174, 176

(56) References Cited

U.S. PATENT DOCUMENTS

| | | | |
|---|---|---|---|
| 4,325,885 | * 4/1982 | Dozzi et al. ......................... | 260/448 |
| 4,543,399 | 9/1985 | Jenkins, III et al. ................... | 526/70 |
| 4,752,597 | 6/1988 | Turner ................................. | 502/104 |
| 4,808,561 | 2/1989 | Welborn, Jr. ......................... | 502/104 |
| 5,198,401 | 3/1993 | Turner et al. ........................ | 502/155 |
| 5,352,749 | 10/1994 | De Chellis et al. ................... | 526/68 |
| 5,455,322 | * 10/1995 | Jansen ................................. | 528/9 |
| 5,648,310 | 7/1997 | Wasserman et al. ................. | 502/120 |
| 5,672,669 | 9/1997 | Wasserman et al. ................. | 526/170 |
| 5,674,795 | 10/1997 | Wasserman et al. .................... | 502/9 |
| 5,777,120 | 7/1998 | Jordan et al. ............................. | 546/2 |
| 5,965,677 | * 10/1999 | Stephan et al. ....................... | 526/129 |
| 6,013,745 | * 1/2000 | McKay et al. ........................ | 526/132 |
| 6,133,387 | * 10/2000 | Xu et al. .............................. | 526/172 |
| 6,147,172 | * 11/2000 | Brown et al. ........................ | 526/126 |

OTHER PUBLICATIONS

Advanced Inorganic Chemistry, A Comprehensive Text, Fifth Edition, pp. 208–233, Chapter Seven, The Group IIIA (13) Elements: Al, Ga, In, T1 No date available.

* cited by examiner

Primary Examiner—Mark L. Bell
Assistant Examiner—Michael J. DiVerdi
(74) Attorney, Agent, or Firm—Kenneth H. Johnson

(57) ABSTRACT

Aluminum-phosphinimine complexes function as a component in a catalyst system for the (co)polymerization of ethylene. The inventive catalyst components form a highly productive polymerization system when activated with so-called "ionic activators". The need for conventional transition metal catalyst metals (such as titanium, hafnium, zirconium or vanadium) is eliminated.

16 Claims, No Drawings

ALUMINUM-PHOSPHINIMINE COMPLEXES AS CATALYSTS FOR THE (CO) POLYMERIZATION OF ETHYLENE

FIELD OF THE INVENTION

This invention relates to the catalytic polymerization of ethylene using an aluminum-phosphinimine catalyst component.

BACKGROUND OF THE INVENTION

The use of transition metals, especially chromium or Group 4/5 metals such as titanium, zirconium and hafnium as catalysts in the polymerization of ethylene is well known. These polymerization reactions may use simple aluminum alkyls of the general formula $ALR_3$ as cocatalysts.

U.S. Pat. No. 5,777,120 (Jordan et al) discloses aluminum-amidinate complexes which catalyzes the polymerization of ethylene in the absence of transition metals.

We have now discovered an aluminum-phosphinimine complex which may be used to catalyze the polymerization of ethylene in the absence of transition metals.

SUMMARY OF THE INVENTION

In one embodiment, this invention provides a catalyst component for ethylene polymerization comprising an aluminum complex which is characterized by containing a phosphinimine ligand.

In another embodiment, this invention provides a process for the (co)polymerization of ethylene and at least one additional alpha olefin having from 3 to 20 carbon atoms wherein said process comprises the catalytic (co) polymerization of said ethylene and said at least one additional alpha olefin in the presence of a catalyst system comprising:

1) an aluminum complex which is characterized by containing a phosphinimine ligand; and
2) an activator.

DETAILED DESCRIPTION OF PREFERRED EMBODIMENTS 1.1 Description of Catalyst Components Aluminum is a member of the Group 13 (also known as Group IIIA) elements. The group 13 elements are trivalent and are, by convention, described by the general formula "$ML_3$" wherein M is the metal and L is a ligand. However, as will be appreciated by those skilled in the art, such $ML_3$ compounds may "behave as Lewis acids and can accept either neutral donor molecules or anions to give tetrahedral species"; and "react with themselves to form dimeric molecules" (see, for example, Advanced Inorganic Chemistry, fifth edition, edited by Cotton and Wilkinson, ISBN 0-471-84997-9, p. 209). Thus, even though aluminum compounds form dimers and adducts with neutral donors, these compounds are conventionally referred to by the "$ML_3$" formula.

We have used the $ML_3$ convention in this specification to describe the catalyst components of this invention. As noted above, this convention is intended to be inclusive of dimers and oligomers and/or adducts with neutral donor molecules.

Thus, the present catalyst components may be conveniently described by the formula:

$Al(Pl)X_2$ wherein Pl is a phosphinimine ligand (as described in section 1.2 below) and each X is an activatable ligand (as described in section 1.3 below).

1.2 Phosphinimine Ligand

The catalyst component must contain a phosphinimine ligand which is covalently bonded to the metal. These phosphinimine ligands are characterized by containing a nitrogen which is bonded to the aluminum by a single covalent bond and a phosphorus (V) atom which is doubly bonded to this nitrogen atom. Preferred phosphinimine ligands are defined by the formula:

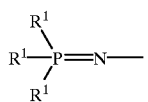

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

$-Si-(R^2)_3$ wherein each $R^2$ is independently selected from the group consisting of hydrogen, a $C_{1-8}$ alkyl or alkoxy radical, $C_{6-10}$ aryl or aryloxy radicals, and a germanyl radical of the formula:

$Ge-(R^2)_3$ wherein $R^2$ is as defined above.

Preferred phosphinimines are those in which each $R^1$ is a hydrocarbyl radical (especially a hydrocarbyl radical having from 1 to 20 carbon atoms). A particularly preferred phosphinimine is tri-(tertiary butyl)phosphinimine (i.e. where each $R^1$ is a tertiary butyl group).

1.3 Activatable Ligand

The term "activatable ligand", X, refers to a ligand which reacts with an "activator" to facilitate olefin polymerization. Activators are described in section 2 below.

Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryl oxy radical, an amido radical which is unsubstituted or substituted by up to two $C_{1-8}$ alkyl radicals; a phosphido radical which is unsubstituted or substituted by up to two $C_{1-8}$ alkyl radicals. Preferred activatable ligands are $C_{1-10}$ hydrocarbyls, especially methyl.

1.4 Preparation of $Al(Pl)X_2$

The preferred preparation of $Al(Pl)X_2$ is by the reaction of a trialkyl aluminum (especially trimethyl aluminum) with a hydrido-phosphinimine (i.e. $HN=PR_3$). The reaction is assisted by heating. The reaction is convenient and facile, as illustrated in the Examples. Moreover, the reaction may be undertaken in-situ (i.e. in the polymerization reactor). The in-situ reaction may employ a trivalent aluminum precursor (such as a trialkyl aluminum—especially TMA, as shown in example 2) or an alumoxane (as shown in example 1) and a hydrido-phosphinimine.

2.0 Activators

Alumoxanes and so-called "ionic activators" are preferred, as described below.

The alumoxane activator may be of the formula:

$(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") is the preferred alumoxane.

Alumoxanes are well known as activators for metallocene-type catalysts and are widely described in the academic and patent literature.

Activation with alumoxane generally requires a molar ratio of aluminum in the activator to aluminum in the catalyst component $Al(Pl)X_2$ from 20:1 to 1000:1. Preferred ratios are from 50:1 to 250:1.

2.1 Ionic activators

Ionic activators are also well known for metallocene catalysts. See, for example, U.S. Pat. No. 5,198,401 (Hlatky and Turner). These compounds may be selected from the group consisting of:

(i) compounds of the formula $[R^5]^+[B(R^7)_4]^-$ wherein B is a boron atom, $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^2)_3$; wherein each $R^2$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene(diazonium)tetrakispentafluorophenyl borate,
tropillium phenyltrispentafluorophenyl borate,
triphenylmethylium phenyltrispentafluorophenyl borate,
benzene(diazonium)phenyltrispentafluorophenyl borate,
tropillium tetrakis(2,3,5,6-tetrafluorophenyl)borate,
triphenylmethylium tetrakis(2,3,5,6-tetrafluorophenyl) borate,
benzene(diazonium)tetrakis(3,4,5-trifluorophenyl)borate,
tropillium tetrakis(3,4,5-trifluorophenyl)borate,
benzene(diazonium)tetrakis(3,4,5-trifluorophenyl)borate,
tropillium tetrakis(1,2,2-trifluoroethenyl)borate,
triphenylmethylium tetrakis(1,2,2-trifluoroethenyl)borate,
benzene(diazonium)tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl) borate, and
benzene(diazonium)tetrakis(2,3,4,5-tetrafluorophenyl) borate.

Readily commercially available ionic activators include:
N,N-dimethylaniliniumtetrakispentafluorophenyl borate,
triphenylmethylium tetrakispentafluorophenyl borate, and
trispentafluorophenyl borane.

The use of boron containing ionic activators is preferred in the catalyst systems and process of this invention. The mole ratio of boron:aluminum (i.e. boron in activator:aluminum in catalyst component) is preferably from 0.5:1 to 2:1 especially from 0.9:1 to 1.1:1.

3. Homogeneous or Heterogeneous Catalyst

The catalyst system of this invention is preferably used in a homogeneous form in solution polymerization (where the term "homogeneous" means that the catalyst and cocatalyst/activator are soluble in, or miscible with, the polymerization solvent). However, when the catalyst is employed in a slurry or gas phase polymerization, it is preferred to use the catalyst in a heterogeneous or "supported form". It is also preferred that the catalyst does not cause reactor fouling. The art of preparing heterogeneous catalysts which do not lead to reactor fouling is not adequately understood, though it is generally accepted that the catalytic material should be very well anchored to the support so as to reduce the incidence of fouling resulting from the deposition of catalyst or cocatalyst which has dissociated from the support.

In general, heterogeneous catalysts may be grouped into three main categories:

3.1 Unsupported Cocatalyst/Catalyst Mixtures

These catalysts may be easily prepared by evaporating the solvent or diluent from a liquid mixture of cocatalyst and the catalyst component. This approach is particularly suitable when using alumoxane as a cocatalyst because the resulting product is a solid at room temperature due to the comparatively high molecular weight of the alumoxane. There are two disadvantages to this approach, namely cost (i.e. alumoxanes are comparatively expensive—and the alumoxane is used as an expensive "support" material) and "reaction continuity/fouling" (i.e. the alumoxane may partially melt under polymerization conditions, leading to reactor instability/fouling). U.S. Pat. No. 4,752,597 (Turner, to Exxon) illustrates this approach for the preparation of a heterogeneous catalyst.

3.2 Conventionally Supported Catalysts

These catalysts are prepared by depositing the catalyst component and a cocatalyst on a support which may be, for example, a polymeric material or an inorganic material such as a metal oxide. Porous metal oxide supports are in wide commercial use and are preferred. Thus, the catalyst and cocatalyst are substantially contained within the pore structure of the metal oxide particle. This means that a comparatively large metal oxide particle is used (typically particle size of from 40 to 80 microns). The preparation of this type of supported catalyst is described in U.S. Pat. No. 4,808,561 (Welborn, to Exxon).

3.3 Filled/Spray Dried Catalysts

This method of catalyst preparation is also well known. For example, U.S. Pat. Nos. 5,648,310; 5,674,795 and 5,672,669 (all to Union Carbide) teach the preparation of a heterogeneous catalyst by spray drying a mixture which contains a metallocene catalyst, an alumoxane cocatalyst and a "filler" which is characterized by having a very small particle size (less than one micron) and by being unreactive with the catalyst and cocatalyst. The examples illustrate the use of very fine particle size "fumed" silica which has been treated to reduce the concentration of surface hydroxyls. The resulting catalysts exhibit good productivity. Moreover, they offer the potential to provide a catalyst which is not prone to "hot spots" (as the catalyst may be evenly distributed, at low concentration, throughout the heterogeneous matrix). However, these catalysts suffer from the potential disadvantage of being very friable because they are prepared with a fine, "inert" filler material which does not react with/anchor to the catalyst or cocatalyst.

Friable catalyst particles lead to the formation of "fines" in the polyethylene product, and may also aggravate reactor fouling problems.

An alternative approach is the preparation of spray dried catalysts using a hydrotalcite as a "reactive" filler (as opposed to the unreactive filler described in the above mentioned U.S. Patent to Union Carbide). This method of catalyst preparation is described in more detail in a commonly assigned patent application. Either approach is suitable for use with the catalysts of this invention.

4. Polymerization Processes

The catalysts of this invention are suitable for use in any conventional olefin polymerization process, such as the so-called "gas phase", "slurry", "high pressure" or "solution" polymerization processes.

The use of a heterogeneous catalyst is preferred for gas phase and slurry processes whereas a homogeneous catalyst is preferred for the solution process.

The polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co- and terpolymers of ethylene, propylene and optionally one or more diene monomers. Generally, such elastomeric polymers will contain about 50 to abut 75 weight % ethylene, preferably about 50 to 60 weight % ethylene and correspondingly from 50 to 25 weight % of propylene. A portion of the monomers, typically the propylene monomer, may be replaced by a non-conjugated diene. The diene may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having density from about 0.910 to 0.935 g/cc. The present invention might also be useful to prepare polyethylene having a density below 0.910 g/cc—the so-called very low and ultra low density polyethylenes.

The most preferred polymerization process of this invention encompasses the use of the novel catalysts (together with a cocatalyst) in a medium pressure solution process. As used herein, the term "medium pressure solution process" refers to a polymerization carried out in a solvent for the polymer at an operating temperature from 100 to 320° C. (especially from 120 to 220° C.) and a total pressure of from 3 to 35 mega Pascals. Hydrogen may be used in this process to control (reduce) molecular weight. Optimal catalyst and cocatalyst concentrations are affected by such variables as temperature and monomer concentration but may be quickly optimized by non-inventive tests.

Further details concerning the medium pressure polymerization process are well known to those skilled in the art and widely described in the open and patent literature.

The catalyst of this invention may also be used in a slurry polymerization process or a gas phase polymerization process.

The typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant—and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and the amount of such condensed fluid preferably does not exceed about 20 weight per cent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may be employed—as is the case in the process of this invention.

EXAMPLES

The invention will now be illustrated in further detail by way of the following non-limiting examples. For clarity, the examples have been divided into two parts, namely Part A (Compound Synthesis) and Part B (Polymerization).

Polymer Analysis

Gel permeation chromatography ("GPC") analysis was carried out using a commercially available chromatograph (sold under the name Waters 150 GPC) using 1,2,4-trichlorobenzene as the mobile phase at 140° C. The samples were prepared by dissolving the polymer in the mobile phase solvent in an external oven at 0.1% (weight/volume) and were run without filtration. Molecular weights are expressed as polyethylene equivalents with a relative standard deviation of 2.9% and 5.0% for the number average molecular weight (Mn) and weight average molecular weight (Mw), respectively.

DSC was conducted on a DSC 220 C from Seiko Instruments. The heating rate is 10° C./min from 0 to 200° C.

FT-IR was conducted on a Nicolet Model 750 Magna IR spectrometer.

The following abbreviations are used in the examples:

$^tBu$=tertiary butyl (e.g. $^tBu_3$=tri-tertiary butyl)

Me=methyl

Et=ethyl $^1H$ NMR=proton nuclear magnetic resonance

Mw=weight average molecular weight

Mn=number average molecular weight

PD=polydispersity (or Mw/Mn)

PE=polyethylene

Cat=catalyst

Hr=hour

M=molar

DSC=differential scanning calorimetry

GPC=gel permeation chromatography

MeOH=methanol

PMAO-IP=methylaluminoxane, purchased from Akzo Nobel

Tm=polymer melting point

FT-IR=Fourier Transform Infrared Analysis

PART A: Compound Synthesis

A.1 Preparation of $^tBu_3P\!=\!NH$ $^tBu_3P\!=\!N\!-\!SiMe_3$ (10 g, 35 mmol, prepared from the reaction of $^tBu_3P$ with neat $Me_3SiN_3$ at 90° C.) was dissolved in a mixture of toluene (50 mL) and methanol (50 mL). 14 small drops of concentrated $H_2SO_4$ was then added to the stirred solution. The solution was heated to 60° C. for 6 hours to complete the reaction. The solution was pumped to dryness and the residue was extracted with heptane (3×20 mL). The combined heptane extract was dried over anhydrous $MgSO_4$ and was filtered. The filtrate was pumped to dryness to give the product in 82% yield (6.13 g, white solid).

No further purification was required. $^1H$ NMR (toluene-$d_8$, δ): 1.203 (d, J=12 Hz).

A.2 Synthesis of $\{^tBu_3P\!=\!NAlMe_2\}_2$; (Parts A.2.1 and A.2.2)

A.2.1 Preparation of $^tBu_3P\!=\!(H).AlMe_3$

To a toluene (25 mL) solution of $AlMe_3$ (1 mL, 2M toluene solution, 2 mmol) at −78° C. was added a toluene (25 mL) solution of $^tBu_3P\!=\!NH$ (0.434 g, 2 mmol). The solution was warmed to room temperature and stirred for one hour. The toluene was evaporated under vacuum to dryness to give a white solid. Yield: 100%. $^1H$ NMR (toluene-$d_8$, δ): 1.01 (d, $^3J_{P\text{-}H}$=13.3 Hz, 27H), −0.30 (s, 9H).

A.2.2 Synthesis of $[^tBu_3P\!=\!NAlMe_2]_2$ $^tBu_3P\!=\!N(H).AlMe_3$ (0.289 g, 1.00 mmol) in toluene (20 mL) was refluxed for one hour. The toluene was evaporated under vacuum to dryness to give a white solid. Yield: 100%. $^1H$ NMR (toluene-$d_8$, δ): 1.36 (d, $^3J_{P\text{-}H}$=12.6 Hz, 27H), −0.12 (s, 6H).

A.3 Synthesis of $^tBu_3P\!=\!NAl_2Me_5$

A mixture of $^tBu_3P\!=\!(H).AlMe_3$ (0.289 g, 1.00 mmol) in toluene (20 mL) and $AlMe_3$ (0.5 mL, 2M toluene solution, 1 mmol) was refluxed for one hour. The toluene was evaporated under vacuum to dryness to give a white solid. Yield: 100%. $^1H$ NMR (toluene-$d_8$, δ): 1.15 (d, $^3J_{P\text{-}H}$=12.8 Hz, 27H), 0.52 (s, 3H), −0.31 (s, 12H).

Polymerization Results

All the polymerization experiments described below were conducted using a 500 mL Autoclave Engineers Zipperclave reactor. All the chemicals (solvent, catalyst and cocatalyst) were fed into the reactor batchwise except ethylene which was fed on demand. No product was removed during the polymerization reaction. The feed streams were purified prior to feeding into the reactor by contact with various absorption media to remove impurities such as water, oxygen, sulfur and polar materials. All components were stored and manipulated under an atmosphere of purified argon or nitrogen. The reactor uses a programmable logical control (PLC) system with Wonderware 5.1 software for the process control. Ethylene polymerizations were performed in the reactor equipped with an air driven stirrer and an automatic temperature control system.

The initial polymerization temperature was 50° C. or 70° C. The polymerization reaction time varied from 20 to 40 minutes for each experiment. The reaction was terminated by adding 5 mL of methanol to the reactor and the polymer was recovered by evaporation of the toluene or by drying it in vacuum. The polymerization activities were calculated based on the weight of the polymer produced.

Toluene was purchased from Aldrich and purified over molsieves prior to use. Trimethyl aluminum (TMA) was purchased from Aldrich and contained 2 M of TMA in toluene. [CPh$_3$][B(C$_6$F$_5$)$_4$] was purchased from Asahi Glass Inc.

All reported pressures are gauge pressures.

PART B: Polymerizations

Example 1

PMAO-IP Plus HNPtBu$_3$ For Ethylene Homopolymerization

Toluene (216 mL) was transferred into the reactor with 0.9 mL of PMAO-IP (4.04 mmol). The solution was heated to 50° C. and saturated with 300 pounds per square inch gauge (psig) of ethylene. HNPtBu$_3$ (67.4 mmol, 14.6 mg) was dissolved in toluene (12.2 mL) and then injected into the reactor. No temperature rise was observed and the polymerization reaction was terminated by adding 5 mL of MeOH after 22 minutes. The polymer was dried. Yield=0.8 g. Activity=32.4 gPE/mmolcat*hr. Tm=127.1° C.

Example 2

TMA Plus HNPtBu$_3$ Activated By [CPh$_3$][B(C$_6$F$_5$)$_4$] For Ethylene Homopolymerization Toluene (216 mL) was transferred into the reactor with 9.4 mL of toluene solution of TMA (0.281 mmol, 0.141 mL) as a scavenger and catalyst precursor. The solution was heated to 50° C. and saturated with 300 psig of ethylene. The HNPtBu$_3$ (0.067 mmol, 14.6 mg) was dissolved in toluene (12.2 mL) and then injected into the reactor. After one minute, [CPh$_3$][B(C$_6$F$_5$)$_4$] (0.067 mmol, 61.8 mg) in 12.2 mL of toluene was injected into the reactor. Polymerization occurred quickly and the reaction temperature slowly increased to 70° C. The reaction was terminated by adding 5 mL of MeOH after 40 minutes. The polymer was dried. Yield=7.0 g. Activity=167.3 gPE/mmolcat*hr. Tm=133.7° C. Mw=203,900; Mn=13,400; Pd=15.22.

Example 3

TMA Plus HNPtBu$_3$ Activated By [CPh$_3$][B(C$_6$F$_5$)$_4$] For Ethylene And 1-Octene Copolymerization Toluene (216 mL) and 30 mL of 1-octene was transferred into the reactor with 10 mL of toluene solution of TMA (0.281 mmol, 0.141 mL) as a scavenger and catalyst precursor. The solution was heated to 50° C. and saturated with 300 psig of ethylene. The HNPtBu$_3$ (0.067 mmol, 14.6 mg) was dissolved in toluene (12.6 mL) and then injected into the reactor. After one minute, [CPh$_3$][B(C$_6$F$_5$)$_4$] (0.067 mmol, 61.8 mg) in 12.2 mL of toluene was injected into the reactor. Polymerization occurred quickly but no increase in temperature was observed. The reaction was terminated by adding 5 mL of MeOH after 40 minutes. The polymer was dried. Yield=3.7 g. Activity=85.65 gPE/mmolcat*hr. Tm=125.1° C. 3.2 branches per 1000 carbon atoms were detected by FT-IR. Mw=691,600; Mn=73,000; Pd=9.47.

Example 4

TMA Plus HNPtBu$_3$ Activated By [CPh$_3$][B(C$_6$F$_5$)$_4$] For Ethylene And 1-Octene Copolymerization Toluene (216 mL) and 30 mL of 1-octene was transferred into the reactor with 10 mL of toluene solution of TMA (0.281 mmol, 0.141 mL) as a scavenger and catalyst precursor. The solution was heated to 70° C. and saturated with 300 psig of ethylene. The HNPtBu$_3$ (0.067 mmol, 14.6 mg) was dissolved in toluene (12.6 mL) and then injected into the reactor. After one minute, [CPh$_3$][B(C$_6$F$_5$)$_4$] (0.067 mmol, 61.8 mg) in 12.2 mL of toluene was injected into the reactor. Polymerization occurred quickly and the temperature increased to over 80° C. The reaction was terminated by adding 5 mL of MeOH after 30 minutes. The polymer was dried. Yield=6.0 g. Activity=179.7 gPE/mmolcat*hr. Tm=121.1° C. 4.7 branches per 1000 carbon atoms were detected by FT-IR. Mw=919,200; Mn=199,100; Pd=4.62.

Example 5

TMA Plus [CPh$_3$][B(C$_6$F$_5$)$_4$] For Ethylene Homopolymerization

Toluene (216 mL) was transferred into the reactor with 10 mL of toluene solution of TMA (0.281 mmol, 0.141 mL) as a scavenger and catalyst precursor. The solution was heated to 50° C. and saturated with 300 psig of ethylene. [CPh$_3$][B(C$_6$F$_5$)$_4$] (0.067 mmol, 61.8 mg) in 12.2 mL of toluene was injected into the reactor. The reaction was terminated by adding 5 mL of MeOH after 30 minutes. The polymer was dried. Yield=0.210 g. Activity=6.48 gPE/mmolcat*hr. Tm=134.1° C.

Example 6

[NPtBu$_3$AlMe$_2$]$_2$ Activated By [CPh$_3$][B(C$_6$F$_5$)$_4$] For Ethylene Homopolymerization Toluene (216 mL) was transferred into the reactor with 0.06 mL of PMAO-IP as a scavenger. The solution was heated to 50° C. and saturated with 300 psig of ethylene. The [NPtBu$_3$AlMe$_2$]$_2$ (0.065 mmol, 35.44 mg) was dissolved in toluene (12.2 mL) and loaded into the catalyst injection bomb. [CPh$_3$][B(C$_6$F$_5$)$_4$] (0.136 mmol, 125.52 mg) was also dissolved in toluene (12.2 mL) and loaded into the cocatalyst injection bomb. Both components were injected into the reactor simultaneously. Polymerization occurred slowly and the reaction temperature increased to 65° C. after 20 minutes. The reaction was terminated by adding 5 mL of MeOH after 40 minutes. The polymer was dried. Yield=0.774 g. Activity=17.92 gPE/mmolcat*hr.

What is claimed is:

1. A catalyst component for ethylene polymerization comprising an aluminum complex which is characterized by containing a phosphinimine ligand.

2. The catalyst component of claim 1 wherein said phosphinimine ligand is defined by the following formula:

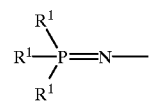

wherein each R$^1$ is independently selected from the group consisting of a hydrogen atom, a halogen atom, C$_{1-20}$ hydrocarbyl radicals which are unsubstituted by or further substituted by a halogen atom, a C$_{1-8}$ alkoxy radical, a C$_{6-10}$ aryl or aryloxy radical, an amido radical, a silyl radical of the formula:

wherein each R$^2$ is independently selected from the group consisting of hydrogen, a C$_{1-8}$ alkyl or alkoxy radical, C$_{6-10}$ aryl or aryloxy radicals, and a germanyl radical of the formula:

wherein R² is as defined above.

3. The catalyst component according to claim 2 wherein each of said R¹ groups is a hydrocarbyl containing up to 20 carbon atoms.

4. The catalyst component according to claim 3 wherein each of said R¹ groups is tertiary butyl.

5. The catalyst component according to claim 3 wherein said aluminum complex is described by the formula:

wherein Pl is a phosphinimine ligand and each X is an activatable ligand.

6. The catalyst component according to claim 5 wherein each activatable ligand X is independently a $C_{1-10}$ hydrocarbyl group.

7. A catalyst system for ethylene (co)polymerization comprising:
  1) an aluminum complex which is characterized by containing a phosphinimine ligand; and
  2) an activator.

8. The catalyst system according to claim 7 wherein said phosphinimine ligand is defined by the formula:

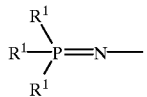

wherein each R¹ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

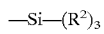

wherein each R² is independently selected from the group consisting of hydrogen, a $C_{1-8}$ alkyl or alkoxy radical, $C_{6-10}$ aryl or aryloxy radicals, and a germanyl radical of the formula:

wherein R² is as defined above.

9. The catalyst system according to claim 8 wherein said activator is an ionic activator.

10. The catalyst system according to claim 9 wherein said ionic activator is selected from the group consisting of boron activators defined by the formulae:
  (i) compounds of the formula $[R^5]^+[B(R^7)_4]^-$ wherein B is a boron atom, R⁵ is a cyclic $C_{5-7}$ aromatic cation or a triphenyl methyl cation and each R⁷ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—(R²)₃; wherein each R² is independently selected from the group consisting of a hydrogen atom and a $C_{1-4}$ alkyl radical;
  (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and R⁸ is selected from the group consisting of $C_{1-8}$ alkyl radicals, a phenyl radical which is unsubstituted or substituted by up to three $C_{1-4}$ alkyl radicals, or one R⁸ taken together with the nitrogen atom may form an anilinium radical and R⁷ is as defined above; and
  (iii) compounds of the formula $B(R^7)_3$ wherein R⁷ is as defined above.

11. The catalyst system according to claim 10 wherein said aluminum complex is described by the formula:

wherein Pl is a phosphinimine ligand and each X is an activatable ligand.

12. The catalyst system according to claim 11 wherein each activatable ligand is independently a $C_{1-10}$ hydrocarbyl group and wherein said phosphinimine ligand is defined by the formula:

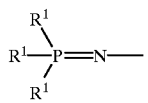

wherein each R¹ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

wherein each R² is independently selected from the group consisting of hydrogen, a $C_{1-8}$ alkyl or alkoxy radical, $C_{6-10}$ aryl or aryloxy radicals, and a germanyl radical of the formula:

wherein R² is as defined above.

13. The catalyst system according to claim 11 in combination with a catalyst support.

14. The catalyst system according to claim 13 wherein said catalyst support is silica.

15. A process for the (co)polymerization of ethylene and at least one additional alpha olefin having from 3 to 20 carbon atoms wherein said process comprises the catalytic (co)polymerization of said ethylene and said at least one additional alpha olefin in the presence of a catalyst system comprising:
  1) an aluminum complex which is characterized by containing a phosphinimine ligand; and
  2) an activator.

16. The process of claim 15 wherein said aluminum complex is defined by the formula:

wherein Pl is a phosphinimine ligand; and each X is an activatable ligand and said activator is selected from the group consisting of boron activators defined by the formulae:
  (i) compounds of the formula $[R^5]^+[B(R^7)_4]^-$ wherein B is a boron atom, R⁵ is a cyclic $C_{5-7}$ aromatic cation or a triphenyl methyl cation and each R⁷ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^2)_3$; wherein each $R^2$ is independently selected from the group consisting of a hydrogen atom and a $C_{1-4}$ alkyl radical;

(ii) compounds of the formula $[(R^8)_t ZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

* * * * *